(12) United States Patent
Kahnert

(10) Patent No.: US 9,618,104 B2
(45) Date of Patent: Apr. 11, 2017

(54) ANTI-BACKLASH NUT ASSEMBLY

(71) Applicant: HELIX LINEAR TECHNOLOGIES, Beachwood, OH (US)

(72) Inventor: Christopher A. Kahnert, Lorain, OH (US)

(73) Assignee: Helix Linear Technologies, Beachwood, OH (US)

( * ) Notice: Subject to any disclaimer, the term of this patent is extended or adjusted under 35 U.S.C. 154(b) by 0 days.

(21) Appl. No.: 14/692,687

(22) Filed: Apr. 21, 2015

(65) Prior Publication Data

US 2015/0300466 A1    Oct. 22, 2015

Related U.S. Application Data

(60) Provisional application No. 61/982,000, filed on Apr. 21, 2014.

(51) Int. Cl.
| | | |
|---|---|---|
| F16H 55/18 | (2006.01) | |
| F16H 25/24 | (2006.01) | |
| F16H 25/22 | (2006.01) | |

(52) U.S. Cl.
CPC ......... *F16H 25/24* (2013.01); *F16H 25/2209* (2013.01)

(58) Field of Classification Search
CPC .. F16H 25/24; F16H 25/2209; F16H 25/2009; F16H 25/2006; F16B 39/36; F16B 37/0864
USPC ........................... 74/441, 424.81, 89.39, 127
See application file for complete search history.

(56) References Cited

U.S. PATENT DOCUMENTS

| | | | | |
|---|---|---|---|---|
| 4,249,426 A | * | 2/1981 | Erikson | F16B 39/36 411/262 |
| RE32,433 E | * | 6/1987 | Erikson | F16B 39/36 411/262 |
| 4,954,032 A | | 9/1990 | Morales | |
| 5,027,671 A | * | 7/1991 | Erikson | F16H 25/2009 411/270 |
| 5,839,321 A | | 11/1998 | Siemons | |
| 5,913,940 A | * | 6/1999 | Erikson | F16H 25/2009 411/270 |
| 6,240,798 B1 | * | 6/2001 | Erikson | F16H 25/2009 74/424.81 |
| 7,992,456 B2 | * | 8/2011 | Schroeder | F16H 25/2006 74/89.39 |
| 9,243,697 B2 | * | 1/2016 | Schroeder | F16H 25/2009 |

(Continued)

OTHER PUBLICATIONS

International Search Report and Written Opinion from PCT/US2015/026952, dated Jul. 20, 2015.

*Primary Examiner* — William Kelleher
*Assistant Examiner* — Zakaria Elahmadi
(74) *Attorney, Agent, or Firm* — Calfee, Halter & Griswold, LLP

(57) ABSTRACT

An anti-lash nut assembly for installation on a threaded rod and including a lead nut, a collar, and a spring positioned between the lead nut and the collar. The lead nut has a set of tabs extending radially outward from a rear end of the body. The collar has a set of clearance slots on an inside surface. The set of clearance slots are configured for sliding of the set of tabs through the clearance slots in the rear direction. The collar has a set of ramps on an inside surface. Each of the set of ramps is configured for engagement with each of the set of tabs to prohibit axial movement of the collar in the rear direction.

21 Claims, 8 Drawing Sheets

(56) References Cited

U.S. PATENT DOCUMENTS

2009/0126521 A1* 5/2009 Schroeder ........... F16B 37/0864
                                                                  74/127
2011/0132113 A1* 6/2011 Song ................... F16H 25/2006
                                                                  74/10.85

* cited by examiner

ANTI-BACKLASH NUT ASSEMBLY

CROSS-REFERENCE TO RELATED APPLICATION

This application claims the benefit of and priority to U.S. Provisional Patent Application Ser. No. 61/982,000, entitled ANTI-BACKLASH NUT ASSEMBLY and filed Apr. 21, 2014, the entire disclosure of which is incorporated herein by reference, to the extent that it is not conflicting with the application.

BACKGROUND

Space or play between a threaded nut and a threaded screw is generally referred to as backlash. Nut and screw assemblies may have both radial and axial backlash between the threads for various reasons, such as for example, limitations in manufacturing. Further, additional backlash can be generated during the life of the assembly from wear caused by friction. In application of the assembly, backlash can cause many problems, such as for example, inefficiencies and positioning errors.

To compensate for or reduce the effects of backlash, various prior art mechanisms have been developed. For example, two-piece threaded nuts for use with a threaded power screw are known in the art. One known strategy to eliminate axial and radial backlash in a two-piece nut assembly, while also compensating for the material wear, is to maintain a continuous internal force between two threaded nuts. A compression spring forcing two threaded nuts away from each other, creating a preload, has been used to eliminate backlash. Although the arrangement is both relatively easy to assemble and economical, the design presents several problems.

The force which the compression spring puts onto the opposing nuts is typically relatively large. A large amount of axial force creates a significant drag torque. The mechanical device which is driving the power screw must overcome this torque in operation. However, if the axial force is not relatively large, which would lower the drag torque, the load applied to the nut during its application may overcome the spring force. When the force of the compression spring is less than the force of the applied load, the preload becomes ineffective and the backlash is reintroduced.

SUMMARY OF THE INVENTION

According to an exemplary embodiment of the present invention, an anti-backlash nut assembly is arranged to compensate for backlash.

In an exemplary embodiment, an anti-lash nut assembly for installation on a threaded rod includes a lead nut, a collar and a spring. The assembly is configured for the collar to be assembled to the lead nut with the lead nut already installed on the threaded rod.

Further features and advantages of the invention will become apparent from the following detailed description made with reference to the accompanying drawings.

BRIEF DESCRIPTION OF THE DRAWINGS

Features and advantages of the invention will become apparent from the following detailed description made with reference to the accompanying drawings.

DETAILED DESCRIPTION

This Detailed Description merely describes exemplary embodiments in accordance with the general inventive concepts and is not intended to limit the scope of the invention or the claims in any way. Indeed, the invention as described by the claims is broader than and unlimited by the exemplary embodiments set forth herein, and the terms used in the claims have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, percentages and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

Lead screws and nuts are used to convert rotary motion into linear motion. In order to move freely there has to be some clearance between the nut and the screw. The clearance can cause reduced positional accuracy, which is unacceptable in certain applications. This loss of positional accuracy is called lash or backlash. Several methods are employed to reduce, or remove, backlash.

Figure 1:
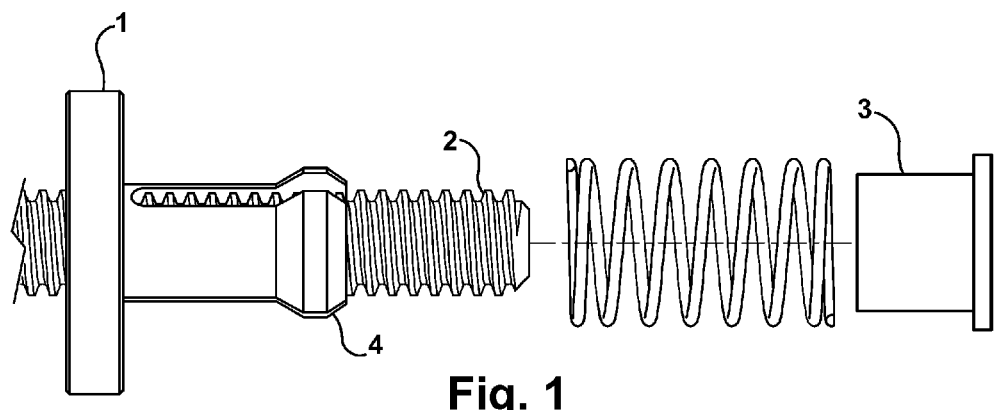
FIG. 1 is an exploded assembly view of a prior art anti-backlash nut assembly.
Figure 2:
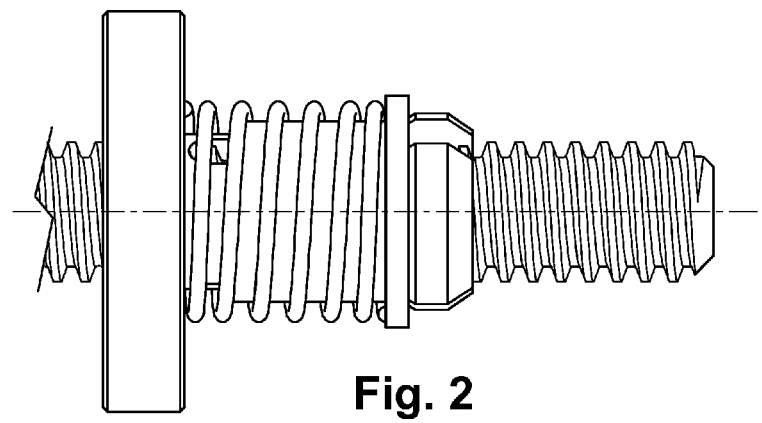
FIG. 2 is a view of the nut assembly of FIG. 1, showing the nut assembly installed on a threaded rod.

A conventional radial anti-backlash lead nut assembly includes a threaded nut, a spring, and a collar. A typical prior art assembly is shown in FIGS. 1 and 2. The assembly includes a lead nut 1, a screw 2, and a collar 3. In the illustrated assembly and in other conventional assemblies, three cuts made down the length of the threaded nut allow the nut body to flex in, radially, toward the screw. A ramp feature 4 on the end of the nut body engages the collar and directs the spring force inward toward the screw. In order to install the spring and the collar on to the nut body, the nut body must flex in, radially, enough for the collar to pass over the ramp feature. Because the ramp feature is intended to squeeze the body of the nut into the screw, there must be interference between the ramp feature and the collar when the threaded nut is installed on the screw. In other words, the lead nut assembly must be assembled prior to installing the threaded nut on the screw. Once the spring and collar are installed on the threaded nut, they have to be held in place while the lead nut assembly is threaded on to the screw. This process is difficult and requires considerable physical dexterity.

The invention differs from a conventional radial anti-backlash lead nut assembly, among other things, in that it can be assembled while the threaded nut is already installed on the screw. In addition, the assembly is self-locking, in other words, if it is removed from the screw it remains an assembly and doesn't have to be held together by some external means. This improvement allows the user to easily assemble, install, and uninstall the lead nut assembly without tools or assistance of any kind.

In one embodiment of the present invention, the assembly includes a lead nut, a collar, and a spring positioned between the lead nut and the collar. The anti-lash nut assembly may be installed on a threaded rod. The lead nut has a front face, a rear face, an elongated body extending axially in the rear direction, a set of tabs extending radially outward from a rear end of the body, and a threaded bore for mating with the threaded rod. The collar has a set of clearance slots on an inside surface. The set of clearance slots are configured for sliding of the set of tabs through the clearance slots in the rear direction. The collar has a set of ramps on an inside surface. Each of the set of ramps is configured for engagement with each of the set of tabs.

The nut assembly may include other features. The engagement of each of the set of ramps with each of the set of tabs may prohibit axial movement of the collar in the rear direction. The engagement may force all or portions of the lead nut body into the threads of the threaded rod. This effect prohibits backlash.

In an embodiment, the set of clearance slots are equally spaced around the inside surface of the collar. The set of tabs, the set of clearance slots, and the set of ramps may be equal in quantity. Further, the set of tabs, the set of clearance slots, and the set of ramps, may each have at least three members. In this case, the set of tabs, the set of clearance slots, and the set of ramps, are spaced 120 degrees apart. Likewise, the set of tabs are equally spaced around the outside surface of the body.

In an embodiment, each of the set of clearance slots extends an axial length of the collar. Each of the set of ramps may extend a partial length of the collar, and each may extend from a rear face of the collar.

In regard to the ramps, each of the set of ramps has a depth which increases in the rear direction. Each of the set of ramps may be tapered in the rear direction. The profile of each of the set of ramps may be planar.

Each of the set of tabs may have a height which increases in the rear direction. Each of the set of tabs may have a tab axial profile different than a ramp axial profile of each of the set of ramps. For example, each of the set of ramps may have a planar profile and each of the set of tabs may have an arcuate profile. In the engagement of the tabs and the ramps, one of each of the set of tabs may engage one of the each of the set of ramps at a point along a slope of the ramp.

In regard to the body, the body may have slots which extend from a rear end toward the rear face of the lead nut. The slots may define elongated body portions, such as for example, fingers, which are flexible inward. The fingers may be forced radially inward by the spring with tab engagement with the ramp.

During assembly, at least one of the set of tabs may extend axially beyond the collar. The collar may be configured for assembly to the lead nut while the lead nut is on the threaded rod. After assembly, the collar remains locked after removal from the threaded rod.

Generally, this invention employs a structure and method which squeezes the body of the nut in, radially, toward the screw to eliminate the clearance in the threads and, thus, reduce the backlash.

The novel collar design which allows this improvement in assembly and installation also captures the flexible end of the split nut body, thereby preventing the ends from flexing tangentially. This improvement, then, also provides a stiffer and more accurate assembly. The novel collar design is also self-limiting, so the assembly will never release due to wear. This improvement, then, is also safer than a conventional radial anti-backlash lead nut.

Instead of a continuous ramp feature around the entire end of the nut body, the radial anti-backlash lead nut has the ramp feature molded into the collar and mating tabs molded in to the nut body. The ramp feature is on the end of a series of equally-spaced slots that fit the tabs on the nut body. The collar also has a series of equally-spaced clearance slots located between the previous slots with the ramp feature. The clearance slots allow the collar to install over the tabs and, with a partial rotation of the collar, engage the tabs on the nut body with the slots that include the ramp feature. With the spring installed over the nut body, the user simply fits the collar into the end of the spring, aligns the clearance slots in the collar with the tabs on the nut body, pushes the collar on to the nut body while compressing the spring, twists the collar until the tabs engage the slots with the ramp feature, and releases the collar. Once the user releases the collar, the spring pushes the collar out to engage the tabs with the ramp feature.

The spring force keeps the ramp feature engaged with the tabs on the nut body. As the threads in the threaded nut body wear, and the split nut body continues to flex inward radially, the collar will continue to move out as the tab engagement progresses up the ramp feature. At some point, the tabs will bottom out on the ramp feature and the compensation for wear will discontinue. However, the collar will never be able to pass over the tabs and release the spring assembly.

Figure 3:
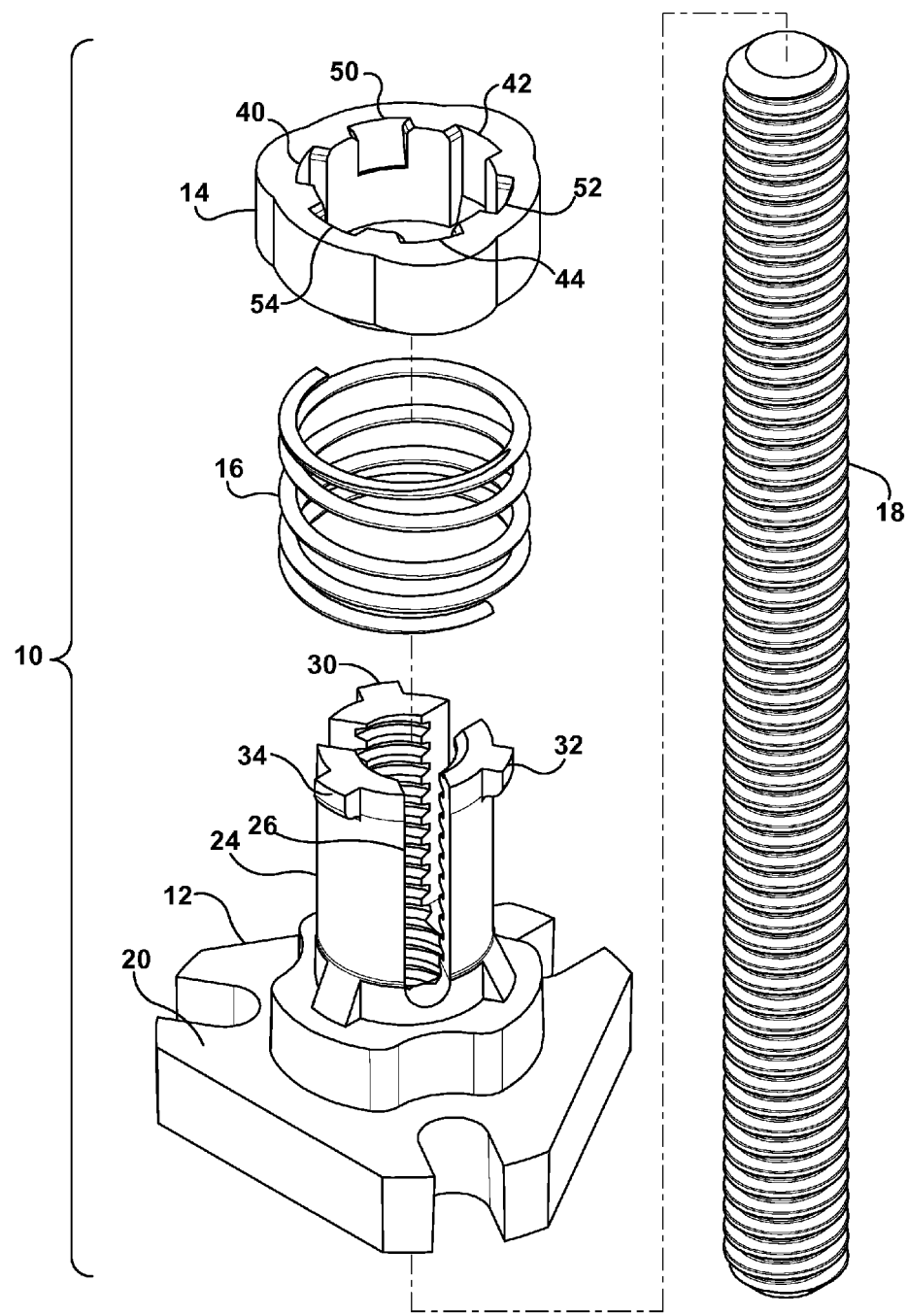
FIG. 3 is a exploded assembly view of an anti-backlash nut assembly.
Figure 4:
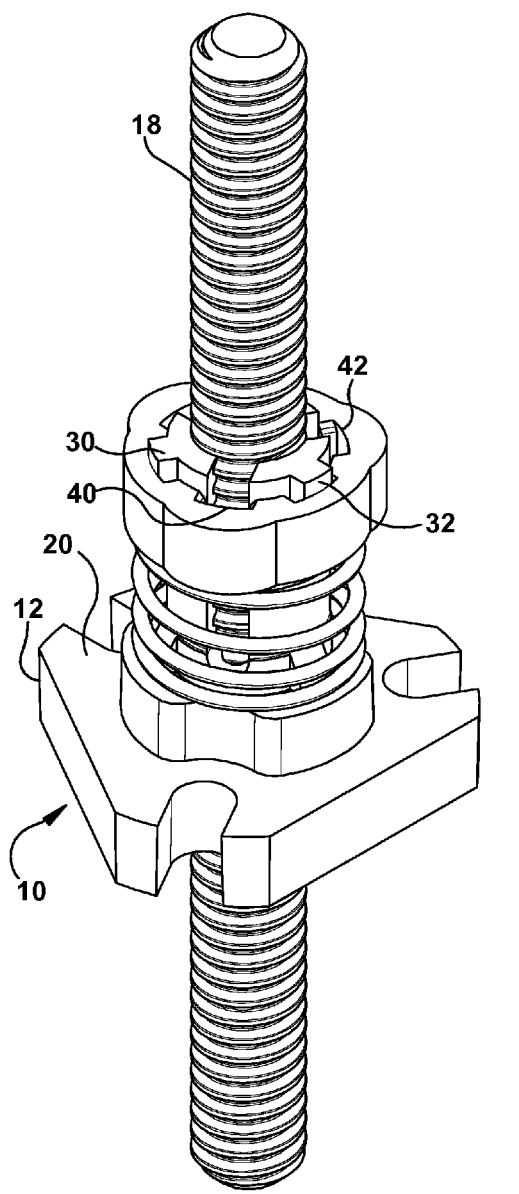
FIG. 4 is a perspective view of the nut assembly of FIG. 3, showing the nut assembly installed on a threaded rod.
Figure 5:
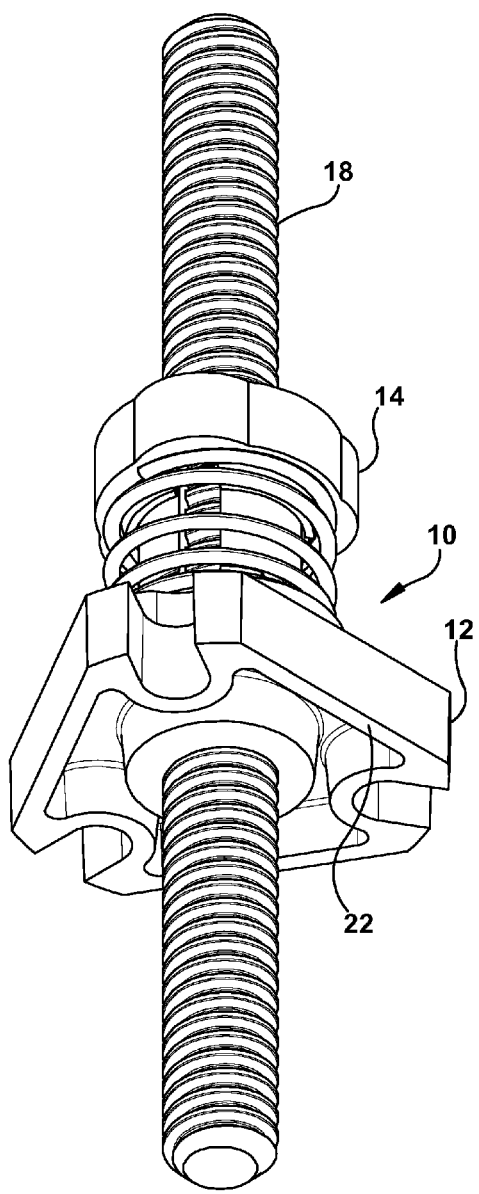
FIG. 5 is another perspective view of the nut assembly of FIG. 3.
Figure 6:
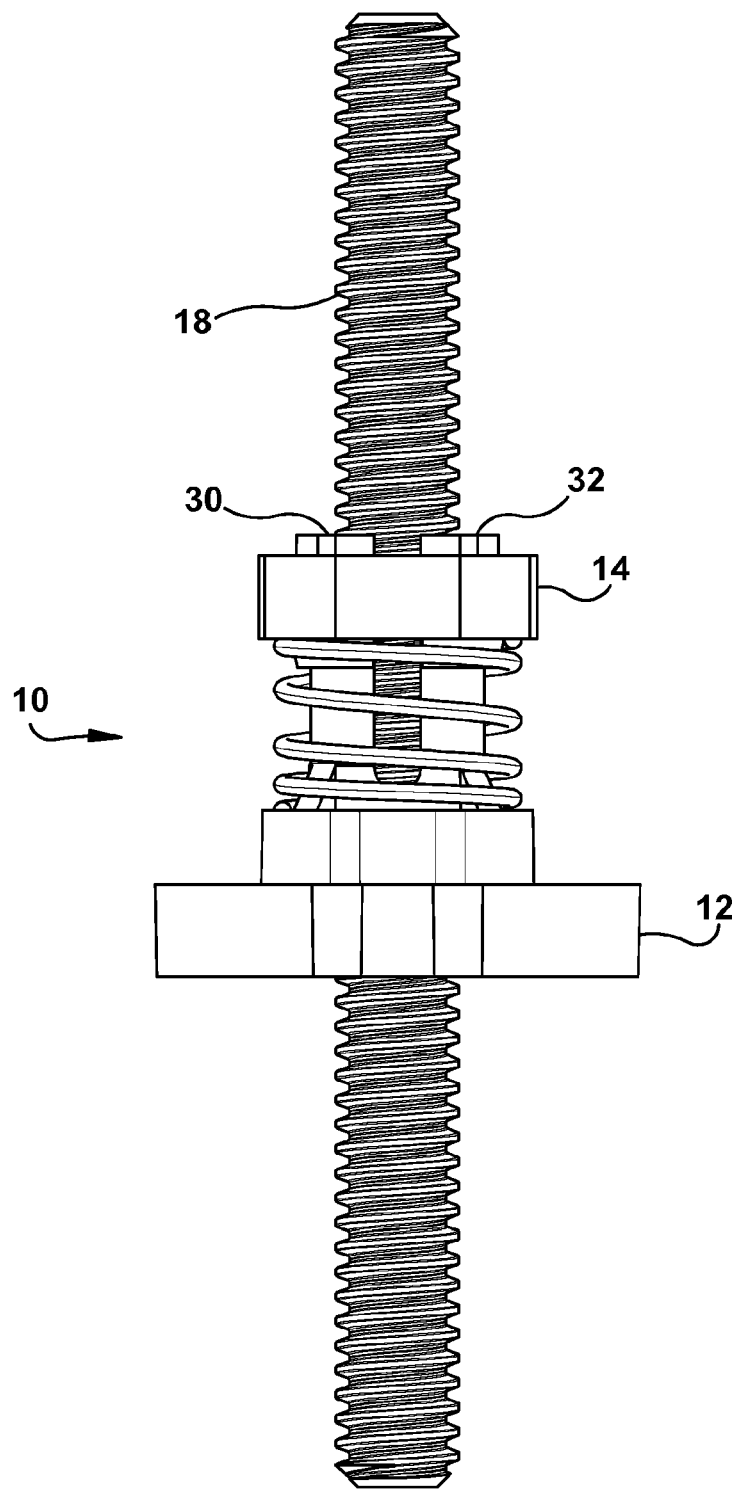
FIG. 6 is a side view of the nut assembly of FIG. 3.
Figure 7:
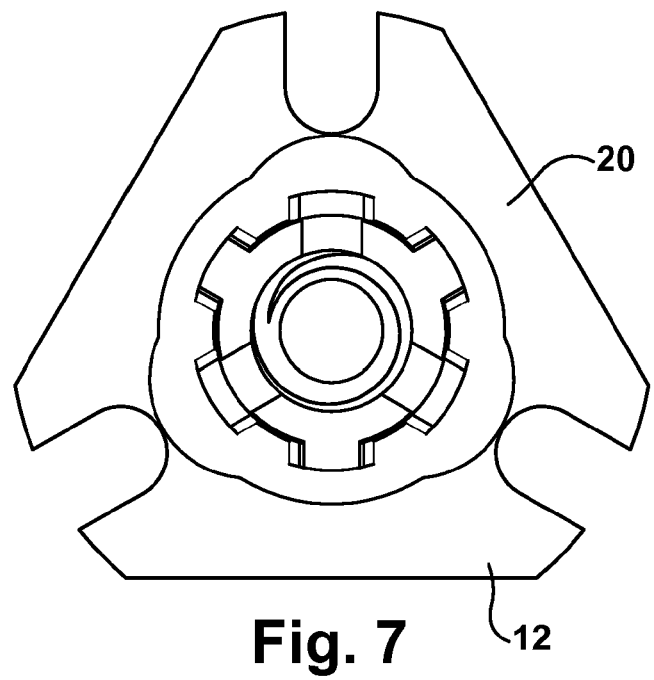
FIG. 7 is a rear view of the nut assembly of FIG. 3.
Figure 8:
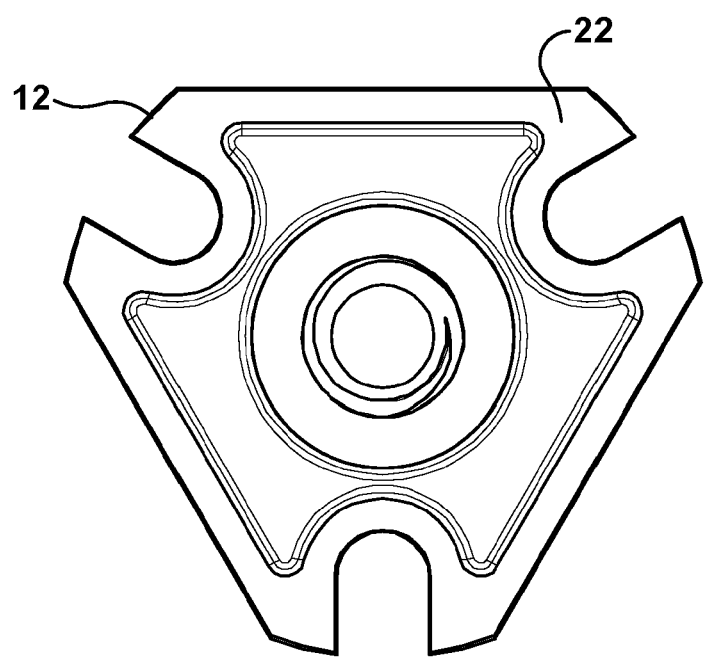
FIG. 8 is a front view of the nut assembly of FIG. 3.
Figure 9:
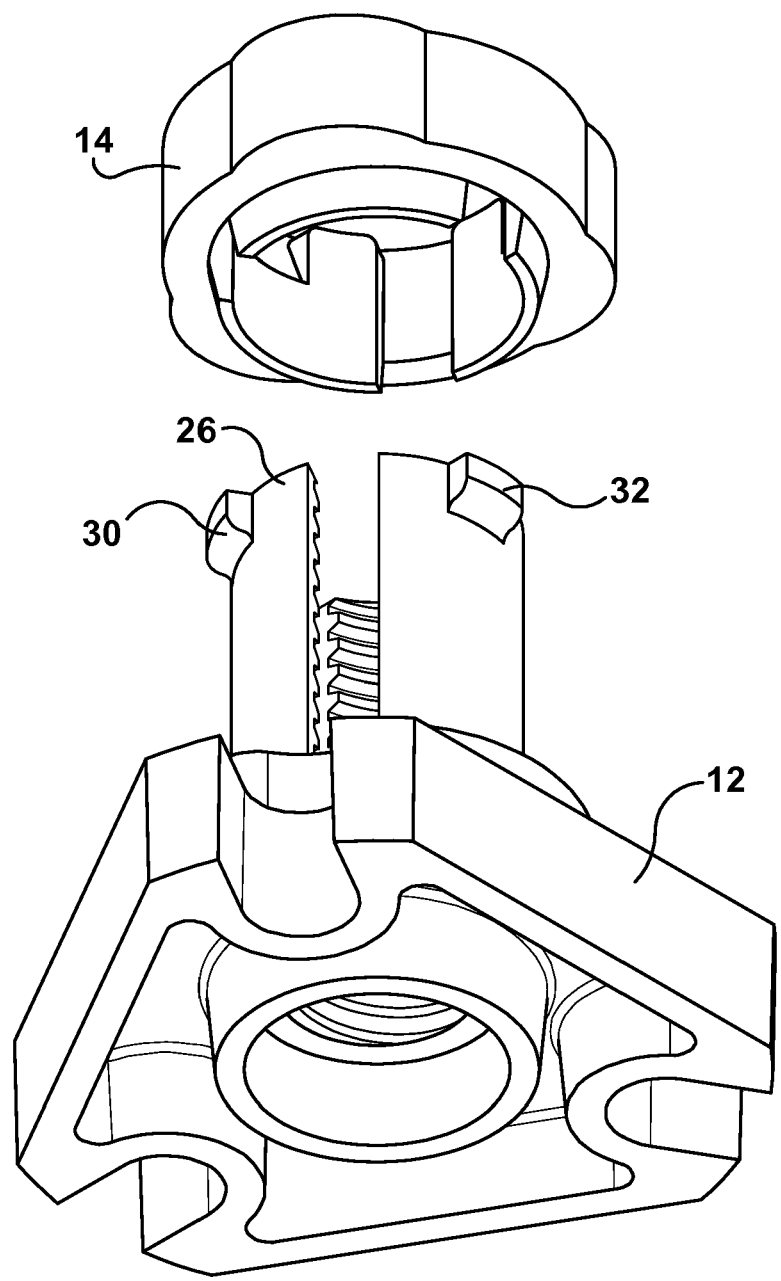
FIG. 9 is a perspective view of the nut assembly of FIG. 3, showing only a lead nut and a collar.
Figure 11:
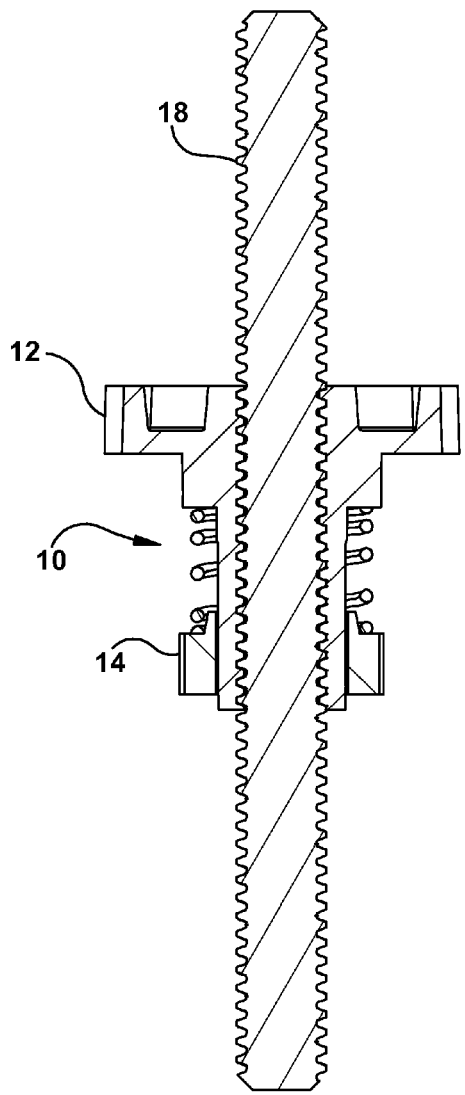
FIG. 11 is another sectional view of the nut assembly of FIG. 3.
Figure 10:
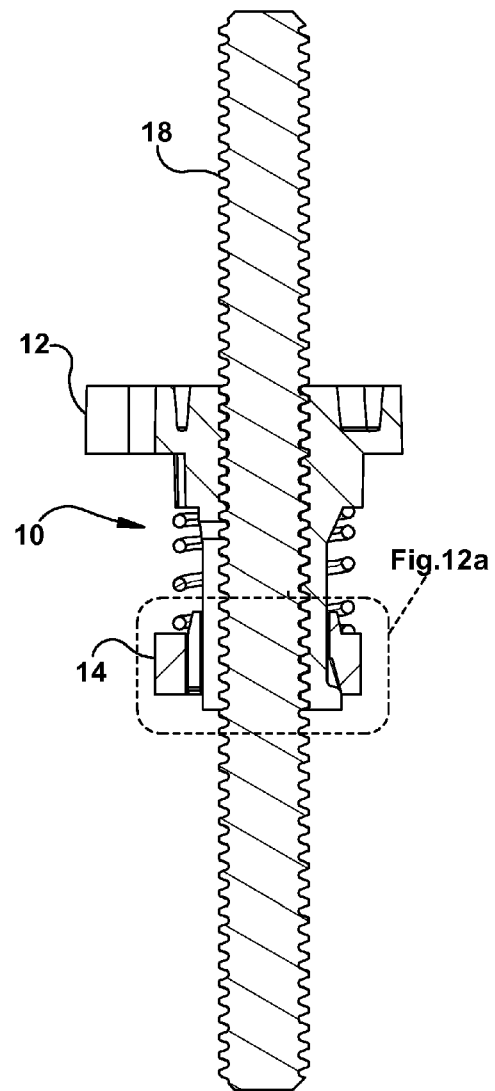
FIG. 10 is a sectional view of the nut assembly of FIG. 3.

Referring now to the drawings, an embodiment of the invention is illustrated in FIGS. 3-12b. An exploded assembly view of an anti-backlash nut assembly is shown in FIG. 3. The nut assembly 10 includes a lead nut 12, a collar 14 and a spring 16. The lead nut has a front face 22, rear face 20, and a body 24 extending rearward. The body is divided into fingers by elongated slots. The fingers are flexible inward. Tabs 30, 32, 34 at the rear end of the fingers extend radially outward.

The collar 14 has a set of clearance slots 40, 42, 44 which extend the entire length of the collar. The collar can be slipped over the body of the lead nut in a direction toward front of the lead nut. After slipping the collar on, the collar can be rotated such that the tabs 30, 32, 34 align with ramps 50, 52, 54 defined in the inside surface of the collar. When the installer lets go of the collar, the spring forces that collar in a direction away from the lead nut until the tabs 30, 32, 34 engage the ramps 50, 52, 54. In the assembly 10 shown, all the tabs, slots and ramps are equally spaced and numbered.

Figure 12A:
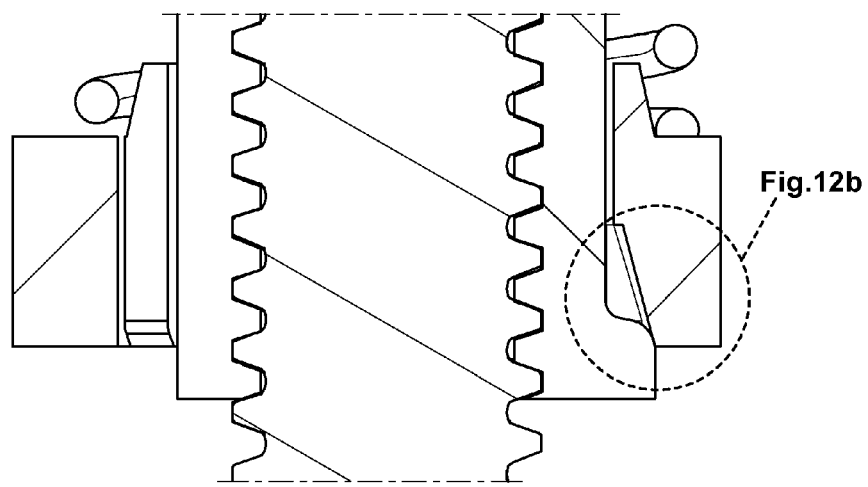
FIG. 12a is a partial sectional view of the nut assembly of FIG. 3.
Figure 12B:
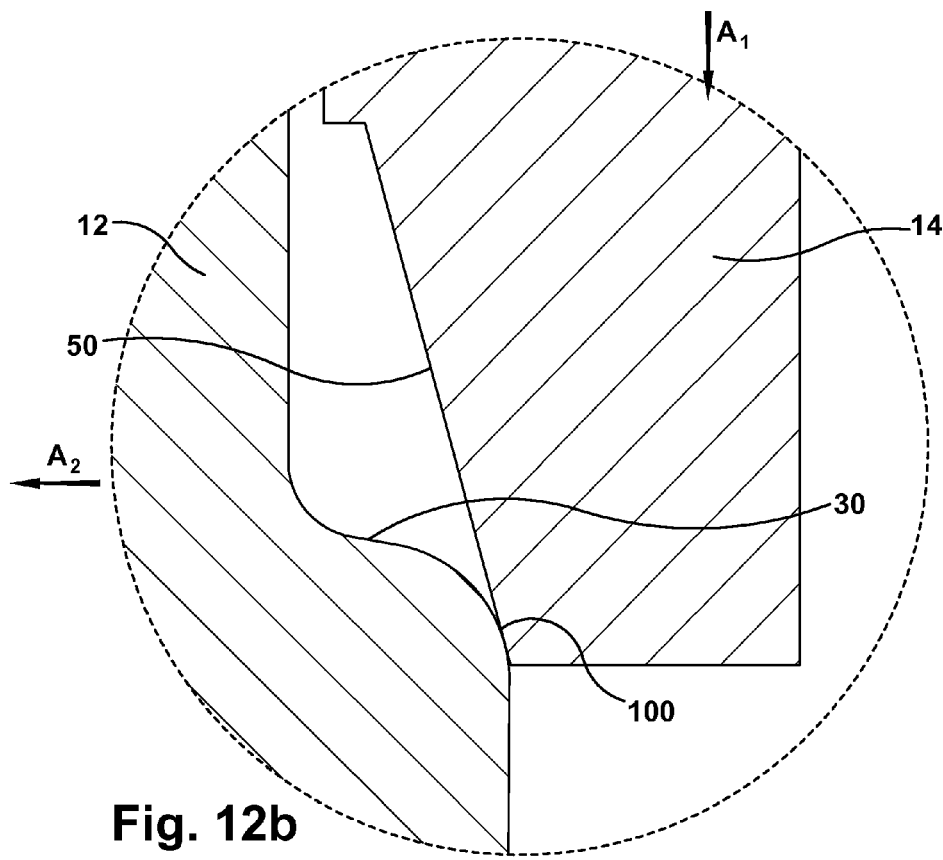
FIG. 12b is a partial sectional view of the nut assembly of FIG. 3.

FIG. 12b shows the contact point of a tab with a ramp during assembly. The lead nut 12 has a tab 30. The profile of the tab is arcuate. The collar 14 has a ramp 50. The profile of the ramp is planar. The ramp contacts the tab at a contact point 100. At contact, the collar is moving in the direction $A_1$ under pressure of the spring. Upon contact, the fingers of the body are under force in a direction $A_2$ into the threads of the rod.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, circuits, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. An anti-lash nut assembly for installation on a threaded rod, the nut assembly comprising:
    a lead nut having a front face, a rear face, an elongated body extending axially in the rear direction, a set of tabs extending radially outward from a rear end of the body, and a threaded bore for mating with the threaded rod;
    a collar having a set of clearance slots on an inside surface, wherein the set of clearance slots permit sliding of the set of tabs through the clearance slots in the rear direction; and
    a spring positioned between the lead nut and the collar; and
    wherein the collar has a set of ramps on an inside surface, wherein each of the set of ramps engage each of the set of tabs when assembled; and
    wherein the lead nut can be assembled to the collar by inserting the rear end of the lead nut into the collar to compress the spring, with the tabs in the clearance slots, and then rotating one of the lead nut and the collar so the tabs and the ramps engage to retain the lead nut and the collar together under force of the spring.

2. The nut assembly of claim 1 wherein engagement of each of the set of ramps with each of the set of tabs prohibits axial movement of the collar in the rear direction.

3. The nut assembly of claim 1 wherein the set of clearance slots are equally spaced around the inside surface of the collar.

4. The nut assembly of claim 1 wherein the set of tabs, the set of clearance slots, and the set of ramps, are equal in quantity.

5. The nut assembly of claim 4 wherein the set of tabs, the set of clearance slots, and the set of ramps, each are spaced 120 degrees apart.

6. The nut assembly of claim 4 wherein the set of tabs are equally spaced around the outside surface of the body.

7. The nut assembly of claim 1 wherein each of the set of clearance slots extends an axial length of the collar.

8. The nut assembly of claim 1 wherein each of the set of ramps extends a partial length of the collar, and each extends from a rear face of the collar.

9. The nut assembly of claim 1 wherein each of the set of ramps has a depth which increases in the rear direction.

10. The nut assembly of claim 1 wherein each of the set of ramps is tapered in the rear direction.

11. The nut assembly of claim 1 wherein each of the set of tabs has a height which increases in the rear direction.

12. The nut assembly of claim 1 wherein each of the set of tabs has a tab axial profile different than a ramp axial profile of each of the set of ramps.

13. The nut assembly of claim 12 wherein each of the set of ramps has a planar profile and each of the set of tabs has an arcuate profile.

14. The nut assembly of claim 13 wherein one of each of the set of tabs engages one of the each of the set of ramps at a point along a slope of the ramp.

15. The nut assembly of claim 1 wherein the body has slots extending from a rear end toward the rear face of the lead nut.

16. The nut assembly of claim 15 wherein the slots define elongated body portions which are flexible inward.

17. The nut assembly of claim 1 wherein at least one of the set of tabs extends axially beyond the collar.

18. The nut assembly of claim 1 wherein the collar is can be assembled to the lead nut while the lead nut is on the threaded rod.

19. The nut assembly of claim 1 wherein the collar remains locked after removal from the threaded rod.

20. The nut assembly of claim 1:
wherein engagement of each of the set of ramps with each of the set of tabs prohibits axial movement of the collar in the rear direction;
wherein the set of tabs, the set of clearance slots, and the set of ramps, are equal in quantity;
wherein each of the set of clearance slots extends an axial length of the collar;
wherein each of the set of ramps has a depth which increases in the rear direction; and
wherein one of each of the set of tabs engages one of the each of the set of ramps at a point along a slope of the ramp, when assembled.

21. An anti-lash nut assembly for installation on a threaded rod, the nut assembly comprising:
a lead nut having a front face, a rear face, an elongated body extending axially in the rear direction, a set of tabs extending radially outward from a rear end of the body, and a threaded bore for mating with the threaded rod;
a collar having a set of clearance slots on an inside surface, wherein the set of clearance slots permit sliding of the set of tabs through the clearance slots in the rear direction; and
a spring positioned between the lead nut and the collar; and
wherein the collar has a set of engagement surfaces on an inside surface, wherein each of the set of engagement surfaces engage each of the set of tabs when assembled; and
wherein the lead nut can be assembled to the collar by inserting the rear end of the lead nut into the collar to compress the spring, with the tabs in the clearance slots, and then rotating one of the lead nut and the collar so the tabs and the engagement surfaces engage to retain the lead nut and the collar together under force of the spring.

* * * * *